(12) United States Patent
Tandon

(10) Patent No.: US 10,992,571 B2
(45) Date of Patent: Apr. 27, 2021

(54) METHOD AND SYSTEM FOR PLUG AND PLAY ROUTING

(71) Applicant: Devashi Tandon, Delhi (IN)

(72) Inventor: Devashi Tandon, Delhi (IN)

(73) Assignee: Devashi Tandon, Delhi (IN)

(*) Notice: Subject to any disclaimer, the term of this patent is extended or adjusted under 35 U.S.C. 154(b) by 32 days.

(21) Appl. No.: 16/531,158

(22) Filed: Aug. 5, 2019

(65) Prior Publication Data

US 2020/0374221 A1    Nov. 26, 2020

(30) Foreign Application Priority Data

May 25, 2019   (IN) .............................. 201911020819

(51) Int. Cl.
*H04L 12/717* (2013.01)
*H04L 12/751* (2013.01)
*H04L 29/08* (2006.01)
*H04L 12/741* (2013.01)

(52) U.S. Cl.
CPC .............. *H04L 45/42* (2013.01); *H04L 45/02* (2013.01); *H04L 45/54* (2013.01); *H04L 69/324* (2013.01)

(58) Field of Classification Search
CPC ......... H04L 45/42; H04L 45/02; H04L 45/54; H04L 69/324
USPC ......................................... 370/351, 389, 392
See application file for complete search history.

(56) References Cited

U.S. PATENT DOCUMENTS

| | | | |
|---|---|---|---|
| 2011/0142051 A1* | 6/2011 | Bhatt | ...................... H04L 45/02 370/392 |
| 2015/0333956 A1* | 11/2015 | James | ...................... H04L 45/48 709/220 |
| 2019/0223029 A1* | 7/2019 | Clarke | .............. H04W 72/0453 |

* cited by examiner

*Primary Examiner* — Obaidul Huq

(57) ABSTRACT

A method for plug and play routing is described. The method includes maintaining, at a central routing server(CRS) coupled to one or more network devices through an out-of-band (OOB) network, routing tables for the one or more network devices; receiving, at the CRS, a message pertaining to a network change event from at least one of the one or more network devices; updating, at the CRS, routing tables of all network devices that would be affected by the network change event; and transmitting, using the CRS, said updated routing tables to the respective affected network devices. The one or more network devices can form an autonomous system (AS). The central routing server is elaborated upon.

18 Claims, 12 Drawing Sheets

METHOD AND SYSTEM FOR PLUG AND PLAY ROUTING

FIELD OF DISCLOSURE

The present disclosure relates in general to networking, and in particular, to a system and a method for plug and play routing.

BACKGROUND OF THE DISCLOSURE

The background description includes information that may be useful in understanding the present invention. It is not an admission that any of the information provided herein is prior art or relevant to the presently claimed invention, or that any publication specifically or implicitly referenced is prior art.

Various networking techniques and protocol for telecommunication, including those used for the Internet are well known. While the need for networking and associated aspects such as bandwidth, speed etc. continues to grow exponentially, the routing protocols and the routing mechanisms used to manage flow of network traffic have been relying on the same technology which existed several years ago. As the size of the networks grow, routing protocols may not be able to scale equally.

In telecommunications networks, a node (interchangeably termed as a network device herein) is either a redistribution point or a communication endpoint. Physically, a node is an active electronic device that is attached to a network, and is capable of creating, receiving, or transmitting information over a communications channel. It could be a data communication equipment (DCE) such as a modem, hub, router, bridge or switch; or data terminal equipment (DTE) such as a digital telephone handset, a printer or a host computer.

Currently, there are two primary types of routing protocols that are used in IP networks. They are the Link State Routing Protocols and the Distance-Vector Routing Protocols. Usually routers used in such protocols split the tables into two: routing tables and forwarding tables. Routing tables usually contain all possible routes, and forwarding tables contain only the best route entries. Since the packet forwarding decisions are made on forwarding tables, they are placed in Dataplane of the router. A routing protocol daemon which manages both the routing and forwarding tables runs in the user space (Control plane) and, based on the routing information it receives, updates the routing tables and calculates the best forwarding table. If there is a change in the forwarding table, it is pushed by the daemon process to the Dataplane.

In case of Distance-Vector based routing protocols, a router maintains a routing table such that the next hop for the reachable network is minimum. It sends a request or a probe (interchangeably termed as health checks) at frequent intervals, to which the neighboring routers respond, by sending their routing table. If the router finds a new network in the list, or a different path for an existing network but with a smaller hop count, it updates its routing table to use the new information, and then generates a new forwarding table and pushes it to the Dataplane.

In case of Link State based routing protocols, each router maintains a complete view of the network as a graph and runs (most commonly) the Dijkstra's algorithm to find the shortest path to every possible destination on the network, and uses this information to generate its routing tables and forwarding tables. The weights on the graph are defined as link costs which are computed based on different factors like bit rate of the link, available bandwidth on that link or configured manually. The weights are a configurable value and the computation method could be defined by the administrator. However, Link State based routing protocols require large amount of memory which is based on the size of the network, heavy computation to generate the routing tables at every node and keeping track of network changes based on regular exchange of messages with neighboring routers.

Today's networks are much more reliable than the networks that existed when the routing protocols were developed. A typical router on a network may run for several months without rebooting/crashing or experiencing other forms of outage. Also, networks don't expand as frequently as the routing protocol traffic is pumped. Usually, network expansion or device replacement would be a planned activity and the frequency of it would not be in seconds but in days or even months/years depending on the requirement of the organization. Whenever devices are added to the network, they are over-provisioned to take into account the expected growth/requirements of the network over a substantial period of time.

In order to maintain routing tables and forwarding tables, routing protocols generate a lot of traffic amongst the routers to keep in sync with the latest state of the network. This traffic (mainly probe messages and responses, collectively also termed as health checks) is generated at regular intervals. Besides the resolution of identifying a network change depends on the time interval between two health checks/probes. For example, in case of OSPF a hello message is sent every 10 seconds (default), and it is only after 40 seconds (default) timeout, that a neighbor router is declared as dead. Hence the routing protocol traffic generated to manage network changes has become inefficient while network devices have advanced.

U.S. Pat. No. 6,856,627B2 (Method for routing information over a network) describes a method to identify a routing path from Node A to Node B by exchanging information between the two nodes over the network. The method uses the actual network or the in-band network to identify the routing path.

However, the method depends upon nodes to exchange information. This leads to a lot of traffic amongst nodes just to keep them in sync with any changes in state of the network. Hence the method is not very efficient, U.S. Pat. No. 7,286,490B2 (Method for routing information over a network employing centralized control) describes a method wherein communication related to routing takes place in-band networks and traditional routing methods are used but with a master node. The master node is used to maintain a topology database. However, network nodes maintain information about neighboring nodes and exchange data to update their information. Protocols related to routing are run on the network nodes, and an in-band routing protocol is described.

Since the method depends on nodes to exchange data to update their information, as already elaborated the method is not very efficient.

US patent application US20140362737A1 (State information and routing table updates in large scale data networks) elaborates upon using a network controller to generate routing tables for network nodes. However, there is no network separation (out-of-band vs in-band) and at least one of the node itself functions as one of the network controllers. There being no separation, nodes serving as network controllers will experience heavy traffic leading to an overall inefficient network.

Hence there is a need in the art for a novel method of routing that reduces the amount of networking traffic amongst various network devices of a network. The method should be scalable as required. Further, reducing resolution (time taken) of identifying a network change can lead to the whole network becoming more responsive by, for example, responding in lesser time to a network device failure. As can be appreciated, such a novel method can lead to more efficient network devices resulting in better network resilience.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Objects of the Invention

Some of the objects of the present disclosure, which at least one embodiment herein satisfies are as listed herein below.

It is an object of the present disclosure to provide for a system that reduces the amount of networking traffic that is exchanged among various networking devices of a network with consequent advantages.

It is an object of the present disclosure to provide for a system that reduces resolution (time taken) of identifying a network change, thus resulting in better network resilience.

It is an object of the present disclosure to provide for more efficient network devices by reducing the amount of processing and memory requirements required on network devices.

SUMMARY

The present disclosure mainly relates to telecommunication networks. In particular, it relates to a system for networking that optimizes routing and improves network resilience, while being inter-operable with other systems.

In an aspect, present disclosure elaborates upon a central routing server (CRS) coupled to one or more network devices through an out-of-band (OOB) network wherein: the CRS maintains routing tables for the one or more network devices and, upon receiving a message pertaining to a network change event from at least one of the one or more network devices, updates routing tables of all network devices that would be affected by the network change event, and transmits the updated routing tables to the respective affected network devices; the one or more network devices are selected from any or a combination of devices in an in-band network that are involved in forwarding data received from one link on one of the one or more network devices to one or more links on at least one another of the one or more network devices, the forwarded data being modified or unmodified data; the routing tables comprise of any tables used in making forwarding decisions by the one or more network devices for forwarding data, and/or any tables used in generating such tables that are used in making forwarding decisions by the one or more network devices; the network change event comprises, for any of the one or more network devices, any or a combination of a software change, device crash, device reboot, device boot up, device shutdown, one or more links going down, one or more links coming up, addition of one or more links, removal of one or more links, device removal or replacement, new network device addition, power outage and power outage resolution; and the software change comprises any or a combination of changes affecting networking capabilities of any of the one or more network devices, one or more configuration changes on any of the one or more network devices, critical user or system process crashing, critical user or system process unable to communicate or process data, critical user or system process functions getting restored, any of the one or more network devices or any component of any of the one or more network devices not responding, and any of the one or more network devices or any component of any of the one or more network devices getting restored.

In another aspect, the one or more network devices can form a first autonomous system (AS).

In yet another aspect, the first AS can co-exist with a second AS whose network devices manage respective routing tables.

In an aspect, the first AS can collaborate with a third AS through respective CRSs, each of the first and third ASs comprising a respective edge router that can be coupled with respective CRS, and wherein the edge routers of the respective first and third ASs can be connected with each other to facilitate transmission of packets between the first and the third ASs.

In another aspect, upon connection of a new network device with at least one of the one or more network devices, the CRS, based on at least one network change event message received from the new network device, can determine network devices that are going to get impacted by addition of the new network device and can update their respective routing tables.

In an aspect, CRS of a fourth AS can connect to network devices in the fourth AS through same OOB port on each of the network devices as used for connecting to management devices, the CRS being part of the OOB management network.

In another aspect, CRS of a fifth AS can connect to network devices of the fifth AS through a dedicated network port on each of the network devices, wherein the CRS is not part of an OOB management network.

In yet another aspect, at least one of the one or more network devices can be a router, the router comprising a network interface card (NIC) that is operatively coupled with a system-on-chip (SoC) having a micro-controller and a memory, the SoC using a port of the router to connect to the CRS such that during normal operation, the router is coupled with other network devices through a port that is controlled by the NIC whereas when the router goes down, the router is connected with the CRS through the port that is controlled by the SoC.

In an aspect, the CRS can be supported by at least one backup CRS and wherein the at least one backup CRS can sync regularly with the CRS using any or a combination of passively listening to network change events received by the CRS and exchanging messages with the CRS.

In another aspect, a node in the out-of-band network can send link break message to at least one of the one or more network devices when the CRS link with the at least one of the one or more network devices fails.

In yet another aspect, a node in the out-of-band network can broadcast CRS failure to all of the one or more network devices when the CRS fails or the at least one backup CRS fails to take over as the CRS when the CRS fails.

In an aspect, the CRS can include one or more processors; a routing protocol unit to control the one or more processors to process, generate and maintain routing information and required logic for various in-band network devices coupled with the CRS; and a network events handler to control the one or more processors to: receive all network change events (NCEs) of various network devices of an autonomous system (AS) that the CRS is monitoring; update routing tables of all network devices that would be affected by the NCE; and transmit the updated routing tables to all the respective affected NDs.

In another aspect, the CRS can include any or a combination of: a collaboration unit to control the one or more processors to enable the CRS to collaborate with CRSs of other autonomous systems, and enable inter-AS routing; a backup unit to control the one or more processors to communicate and sync regularly with a backup CRS and enable the backup CRS to take over from the CRS (primary CRS) in case the CRS fails, determine if the CRS is acting as primary CRS or backup CRS, and enable interactions with all other CRSs in a network; a network database to store various network related information and provide the same to other units to enable efficient networking, wherein the network related information comprises any or a combination of current device tables of all network devices the CRS is coupled with, device configuration of all the network devices and network state with state of all components therein; and a network graph driver to control the one or more processors to enable the CRS to provide a) an overall display of network devices coupled to the CRS in form of an easily comprehensible graph and b) for the Routing Protocol Unit to optimally carry out its routing functions.

In yet another aspect, the CRS can request the one or more network devices for current state of particular device element or complete device state at the time of request such that the one or more network devices read and respond to the requests as network state events.

In an aspect, the network change event can carry any or a combination of unique ID of the at least one of the one or more network devices and unique ID of ports/interfaces of the at least one of the one or more network devices.

In another aspect, the CRS can run periodic health checks on the one or more network devices to ensure connectivity with the one or more network devices.

In yet another aspect, the one or more network devices can request the CRS for the updated routing tables.

In an aspect, the CRS can provide basic interface configuration and initial device tables to a new network device added to the AS to enable the new network device function on the AS.

In an aspect, present disclosure elaborates upon a method for plug and play routing. The method includes: maintaining, at a central routing server(CRS) coupled to one or more network devices through an out-of-band (OOB) network, routing tables for the one or more network devices; receiving, at the CRS, a message pertaining to a network change event from at least one of the one or more network devices; updating, at the CRS, routing tables of all network devices that would be affected by the network change event; and transmitting, using the CRS, the updated routing tables to the respective affected network devices.

In another aspect of the method, the one or more network devices can form a first autonomous system (AS).

The technical problem solved by the present invention is reduction of traffic, reducing resource usage on network devices (memory and processing required for running routing protocols on devices), optimize routing and improve network resilience. The invention achieves this by configuring a central routing server in an OOB network that receives network change events from various network devices of the network and updates their routing tables accordingly. The networking devices need not communicate with each other to determine their status, thus eliminating considerable amount of traffic.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION

Figure 1:
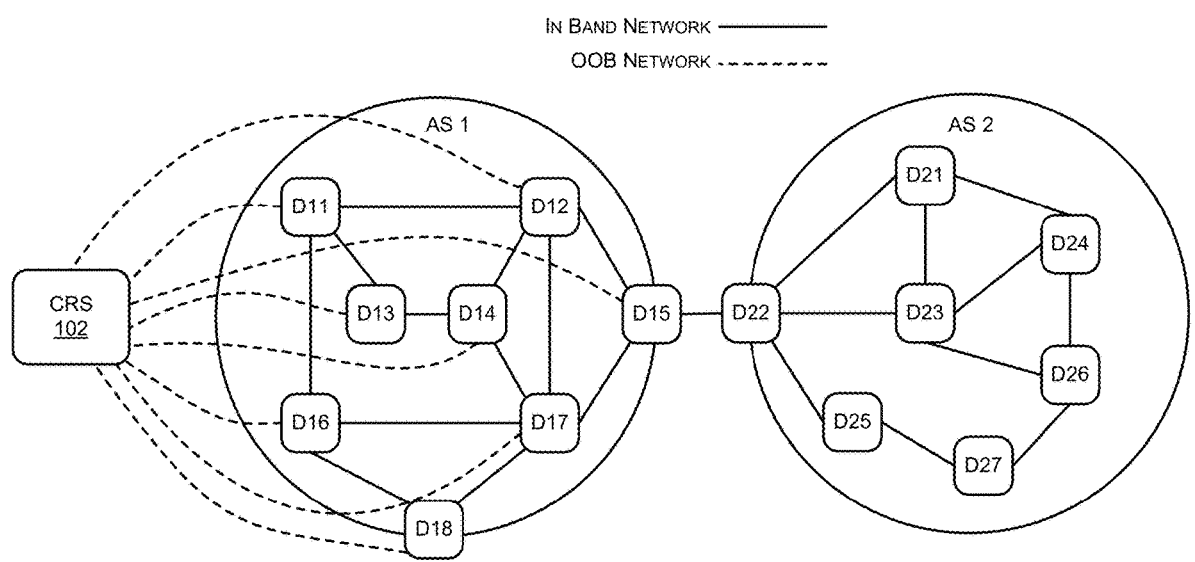
FIG. 1 illustrates a network diagram of an autonomous system (AS) with a Central Routing Server (CRS) based routing as disclosed in present disclosure, co-existing with another autonomous system with traditional routing in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure mainly relates to telecommunication networks. In particular, it relates to a system for networking that optimizes routing and improves network resilience, while being inter-operable with other systems.

In an aspect, present disclosure elaborates upon a central routing server (CRS) coupled to one or more network devices through an out-of-band (OOB) network wherein: the CRS maintains routing tables for the one or more network devices and, upon receiving a message pertaining to a network change event from at least one of the one or more network devices, updates routing tables of all network devices that would be affected by the network change event, and transmits the updated routing tables to the respective affected network devices; the one or more network devices are selected from any or a combination of devices in an in-band network that are involved in forwarding data received from one link on one of the one or more network devices to one or more links on at least one another of the one or more network devices, the forwarded data being modified or unmodified data; the routing tables comprise of any tables used in making forwarding decisions by the one or more network devices for forwarding data, and/or any tables used in generating such tables that are used in making forwarding decisions by the one or more network devices; the network change event comprises, for any of the one or more network devices, any or a combination of a software change, device crash, device reboot, device boot up, device shutdown, one or more links going down, one or more links coming up, addition of one or more links, removal of one or more links, device removal or replacement, new network device addition, power outage and power outage resolution; and the software change comprises any or a combination of changes affecting networking capabilities of any of the one or more network devices, one or more configuration changes on any of the one or more network devices, critical user or system process crashing, critical user or system process unable to communicate or process data, critical user or system process functions getting restored, any of the one or more network devices or any component of any of the one or more network devices not responding, and any of the one or more network devices or any component of any of the one or more network devices getting restored.

In another aspect, the one or more network devices can form a first autonomous system (AS).

In yet another aspect, the first AS can co-exist with a second AS whose network devices manage respective routing tables.

In an aspect, the first AS can collaborate with a third AS through respective CRSs, each of the first and third ASs comprising a respective edge router that can be coupled with respective CRS, and wherein the edge routers of the respective first and third ASs can be connected with each other to facilitate transmission of packets between the first and the third ASs.

In another aspect, upon connection of a new network device with at least one of the one or more network devices, the CRS, based on at least one network change event message received from the new network device, can determine network devices that are going to get impacted by addition of the new network device and can update their respective routing tables.

In an aspect, CRS of a fourth AS can connect to network devices in the fourth AS through same OOB port on each of the network devices as used for connecting to management devices, the CRS being part of the OOB management network.

In another aspect, CRS of a fifth AS can connect to network devices of the fifth AS through a dedicated network port on each of the network devices, wherein the CRS is not part of an OOB management network.

In yet another aspect, at least one of the one or more network devices can be a router, the router comprising a network interface card (NIC) that is operatively coupled with a system-on-chip (SoC) having a micro-controller and a memory, the SoC using a port of the router to connect to the CRS such that during normal operation, the router is coupled with other network devices through a port that is controlled by the NIC whereas when the router goes down, the router is connected with the CRS through the port that is controlled by the SoC.

In an aspect, the CRS can be supported by at least one backup CRS and wherein the at least one backup CRS can sync regularly with the CRS using any or a combination of passively listening to network change events received by the CRS and exchanging messages with the CRS.

In another aspect, a node in the out-of-band network can send link break message to at least one of the one or more network devices when the CRS link with the at least one of the one or more network devices fails.

In yet another aspect, a node in the out-of-band network can broadcast CRS failure to all of the one or more network devices when the CRS fails or the at least one backup CRS fails to take over as the CRS when the CRS fails.

In an aspect, the CRS can include one or more processors; a routing protocol unit to control the one or more processors to process, generate and maintain routing information and required logic for various in-band network devices coupled with the CRS; and a network events handler to control the one or more processors to: receive all network change events (NCEs) of various network devices of an autonomous system (AS) that the CRS is monitoring; update routing tables of all network devices that would be affected by the NCE; and transmit the updated routing tables to all the respective affected NDs.

In another aspect, the CRS can include any or a combination of: a collaboration unit to control the one or more processors to enable the CRS to collaborate with CRSs of other autonomous systems, and enable inter-AS routing; a backup unit to control the one or more processors to communicate and sync regularly with a backup CRS and enable the backup CRS to take over from the CRS (primary CRS) in case the CRS fails, determine if the CRS is acting as primary CRS or backup CRS, and enable interactions with all other CRSs in a network; a network database to store various network related information and provide the same to other units to enable efficient networking, wherein the network related information comprises any or a combination of current device tables of all network devices the CRS is coupled with, device configuration of all the network devices and network state with state of all components therein; and a network graph driver to control the one or more processors to enable the CRS to a) provide an overall display of network devices coupled to the CRS in form of an easily comprehensible graph and b) for the Routing Protocol Unit to optimally carry out its routing functions.

In yet another aspect, the CRS can request the one or more network devices for current state of particular device element or complete device state at the time of request such that the one or more network devices read and respond to the requests as network state events.

In an aspect, the network change event can carry any or a combination of unique ID of the at least one of the one or more network devices and unique ID of ports/interfaces of the at least one of the one or more network devices.

In another aspect, the CRS can run periodic health checks on the one or more network devices to ensure connectivity with the one or more network devices.

In yet another aspect, the one or more network devices can request the CRS for the updated routing tables.

In an aspect, the CRS can provide basic interface configuration and initial device tables to a new network device added to the AS to enable the new network device function on the AS.

In an aspect, present disclosure elaborates upon a method for plug and play routing. The method includes: maintaining, at a central routing server(CRS) coupled to one or more network devices through an out-of-band (OOB) network, routing tables for the one or more network devices; receiving, at the CRS, a message pertaining to a network change event from at least one of the one or more network devices; updating, at the CRS, routing tables of all network devices that would be affected by the network change event; and transmitting, using the CRS, the updated routing tables to the respective affected network devices.

In another aspect of the method, the one or more network devices can form a first autonomous system (AS).

In an aspect, proposed system enables a network to be implemented in such a manner that whenever there is a change in the network, an event is generated in an autonomous manner and the configuration/settings of the affected nodes/network devices (NDs) automatically modified to deal with the change, thereby leading to 'plug and play' routing.

Proposed system allows a network it is operatively coupled with to quickly adopt to the network change while avoiding the need of additional traffic (such as probe messages and responses) to be generated by various NDs in the network for detecting such changes.

As can be appreciated, when an ND goes down so will software running on it and so, it would not be able to inform neighboring NDs of its state. Hence existing routing protocols send probes to neighboring NDs to ensure they are aware of the current state of their neighbors, and the network.

System proposed lessens this present complete dependence on software. However, since the network layer is responsible for making routing decisions and network Layer is built in software, it is a design challenge to develop a routing system that doesn't use software, without being aware of the network layer protocol and its functions. Proposed system overcomes this challenge.

Further, if every ND responds independently to a change in its state (for example: link down or service/device crash) and informs its neighboring NDs (specifically routers) about the change, the routing protocol would need to be invoked at every router to reconfigure the routing tables and adjust to the change to continue to forward traffic through the best path. Hence, a spike in traffic would be seen with every event generating a (re)routing message in the network. As can be appreciated, this leads to deterioration in overall network performance.

Proposed system addresses these concerns and develops a way to ensure stack layer independence and minimum time to reconfigure the NDs, amongst other things.

Present disclosure elaborates upon the system and design proposed by using an example of IP networks running over Ethernet. It can be appreciated, however, that this is only for understanding purposes and concepts and techniques disclosed herein can readily be extrapolated to any other type of network. Further, while a network device can have multiple processors/processing cards, the processor described herein refers to the one that runs control plane of the device.

In an aspect, present disclosure elaborates upon a novel technique to implement its feature of plug and play routing. Unlike existing routing protocols (and corresponding network devices) that rely upon probes and responses being sent to network devices, present disclosure makes a network device responsible to inform its peers and other impacted NDs that it is facing an issue or is ready to provide its services. The network, in turn, adapts to such information received from the network device.

Proposed disclosure describes a central routing server (CRS) that may be located in an out-of-band (OOB) network of the NDs it manages. As known, out-of-band data is the data transferred through a stream that is independent from the main in-band data stream. An out-of-band data mechanism provides a conceptually independent channel, which allows any data sent via that mechanism to be kept separate from in-band data.

The CRS disclosed may be connected via a dedicated out-of-band (OOB) interface/port on each ND (for instance, routers and switches that are handling in-band data stream as well). The CRS can be placed in the same OOB network as the management server, or a separate network. In case of separate network, a separate dedicated port can be configured on each ND using which the ND can connect to the novel CRS being described.

In another exemplary embodiment, a single OOB management can be used, where the CRS can be placed in the OOB network along-with other devices. As an example, and not a limitation, present disclosure elaborates upon the former configuration.

In an aspect, CRS disclosed can build the routing/forwarding tables for each ND and can run the necessary routing algorithms within itself. The routing algorithms running on the CRS can use the information stored on the CRS for generating the routing/forwarding tables for each ND/router node of the network.

In an exemplary embodiment, the CRS can have a backup CRS to handle CRS failures. The backup CRS sync regularly with the 'primary' CRS and/or may work in a listen only mode to the messages received by primary CRS. In this manner, the backup CRS can maintain the most recent state of network.

The CRS while generating the routing tables need not send any traffic to external NDs. The CRS is capable of receiving/processing information received from the NDs it manages (routers/switches etc.) while updating the routing tables.

In effect, CRS disclosed functions like a system which runs routing protocols in software instead of running them on actual NDs. The network devices connect to CRS to receive and pass information to it.

In an aspect, present disclosure envisions a Central Routing Server that may reside/be configured in an out-of-band (OOB) network. Any data sent via this network can remain separate from in-band data (that can be handled via an in-band network). In case the CRS disclosed is configured in an OOB management network then OOB network refers to OOB management network as elaborated below.

Further, proposed method may use a CRS message format that can be format defined by the protocol used for exchanging information between the CRS and various devices (interchangeably termed as network devices or NDs) that the CRS may be operatively connected with for maintaining a network.

Upon addition of a new ND to a network being managed by the proposed CRS, the ND can be enabled to connect to the CRS via an OOB port configured in the ND, before adding the ND to its in-band network. Once the OOB port of the ND has been configured correctly and the device added to the OOB network, the ND can send a network change event (NCE) to the CRS over the OOB network thus informing/indicating to the CRS that a new device has been added to the network (interchangeably termed as 'come up'). The CRS can then add the ND in its network view, and wait for more events.

As in-band connections are added to the ND in the in-band network, the ND can communicate to the CRS information regarding all these network change events and the CRS can then establish connectivity amongst various NDs which are 'coming up'. The CRS can provide initial interface configuration to the ND as well as other NDs which are coming up and can form initial device tables based on computations the CRS can do with the new network model elaborated herein. Accordingly, the ND can become operational at this point, and device tables of all other affected nodes (NDs) can be updated.

In this manner, a new network can be brought up and new devices added sequentially or simultaneously.

In another aspect, in case CRS proposed is added to an existing network, the CRS can broadcast a request to all NDs in the network for their current state and receive this information. Based upon this information the CRS proposed can build a network view and eventually obtain the complete current network state (of the in-band network) in its OOB network. From this point onwards, CRS proposed can operate as elaborated above with the CRS capable of receiving network change events/network state events (both interchangeably termed as network events herein) and responding to them.

In yet another aspect, CRS proposed can receive messages regarding various network events through OOB network in which it is configured, the OOB network in turn connected to various NDs.

For the purpose of this connection, each ND can have a port (OOB port) that it can use to connect to the network (OOB network) in which the CRS resides. The CRS has a unique network related identifier (for example, an IP address) on the OOB network and all NDs can be aware of this address. Further, each ND can have a unique static address (such as a static IP address) which does not change even if the device reboots for any reason on the OOB network and such a static IP address can be assigned to their OOB interface/port. In this manner, the CRS can identify NDs from their static IP addresses. It can be appreciated that the ND is at the same time connected to two networks—an OOB network through its OOB port, and an in-band network as is normally the case for NDs.

When a ND needs to send a message to the CRS, it can create a packet with appropriate information in a CRS Message format and can send this packet through its OOB port to the CRS (that can be part of a server that can be termed CRS server). The CRS can receive the packet and process it appropriately. It can be readily appreciated that since the CRS knows static IP address of all NDs in the OOB network, it can send a message to any of the NDs using their static IP address (interchangeably termed as OOB IP address).

In an aspect, proposed CRS can send table updates to various NDs as required. For the purpose, upon any network event, the CRS can calculate best routes, generate table updates accordingly and send these updates to the NDs that need such updating. If the table for a device does not need any change, CRS proposed does not send any update to it. CRS proposed can create separate messages with appropriate tables for each NDs and may use multiple packets to send the updates to a particular ND. In this manner, after creating packet(s) (in a CRS message format) for various NDs with appropriate information the CRS can send the packet(s) to NDs.

In proposed system being described, the NDs do not run health checks on other NDs, thereby eliminating altogether the probe and response mechanism and consequent disadvantages of distance-vector based routing protocols as elaborated above. CRS proposed may run health checks on various NDs. It is not necessary for the CRS to run health checks and networks can be designed accordingly.

When health checks are required, the CRS can send periodic messages in a CRS Message format to all the network devices in the autonomous system (AS) network it is monitoring. Messages can be broadcast to all NDs or sent separately to each.

Upon receiving a health check message, a ND can respond by a message of its own addressed for the CRS that it is UP. In this manner, the CRS can receive response from all devices in normal operation, which would tell the CRS that devices are active on the OOB network. In case the CRS fails to receive a response from a certain ND, it can be configured to send a pre-determined number of messages (say N) and if it does not get a response to any, can conclude that the ND concerned as lost connectivity. Accordingly, the CRS can 'mark down' the ND since it cannot receive information regarding network events to the ND, neither can it send any updates to the ND, which can lead to stale tables.

After marking the ND down, proposed CRS can recompute/reconfigure the various network routes, generate table updates accordingly and send these updates to the NDs that need such updating (that would be NDs that are affected by the ND going down).

In a similar manner, in case a ND does not receive a health check for a pre-determined period from a CRS enabled to send out health checks, it can assume that it has lost connectivity with the CRS. This can be an optional embodiment.

In an aspect, proposed system can identify network connection failures due to different causes and take actions accordingly. For instance, if a ND suffers a link failure in one of its in-band connections, due to a connection cable getting cut or cable being loose or not properly connected, the ND can detect the failure and send an appropriate message to the CRS.

Similarly, if there is an internal failure within a ND, the ND's operating system can detect it and send a message to the CRS accordingly. High-end routers consist of complex hardware and this may happen therein.

In another exemplary embodiment, if a critical software crashes (for instance, a web proxy server that has been enabled for all communication) the system could lose connectivity. A code or application can be developed specifically to detect such errors and corresponding error codes can be sent to the CRS.

As can be appreciated, a ND can as well identify an immediate neighbor ND connection failure (and only for immediate neighboring NDs) and can generate error messages accordingly that can as well be sent to the CRS.

FIG. 1 illustrates a network diagram of an autonomous system (AS) with a Central Routing Server (CRS) based routing as disclosed in present disclosure, co-existing with another autonomous system with traditional routing in accordance with an exemplary embodiment of the present disclosure.

In an aspect, present disclosure elaborates upon a central routing server (CRS) coupled to one or more network devices through an out-of-band (OOB) network wherein the CRS can maintain routing tables for the one or more network devices and, upon receiving a message pertaining to a network change event from at least one of the one or more network devices, can update routing tables of all network devices that would be affected by the network change event, and can transmits said updated routing tables to the respective affected network devices.

In another aspect, the one or more network devices can form a first autonomous system, and can be selected from any or a combination of devices in an in-band network that are involved in forwarding data received from one link on one of the one or more network devices to one or more links on at least one another of the one or more network devices, the forwarded data being modified or unmodified data.

The routing tables can include any tables used in making forwarding decisions by the one or more network devices for forwarding data, and/or any tables used in generating such tables that are used in making forwarding decisions by the one or more network devices.

In yet another aspect, the first AS can co-exist with a second AS whose network devices can manage respective routing tables.

As illustrated in FIG. 1, CRS 102 proposed can be coupled using an OOB network to one or more network devices (D11, D12, D13, D14, D15, D16, D17 and D18) of a network that can form an autonomous system shown as AS1. The CRS can maintain routing tables for the NDs, and upon receiving a message pertaining to a network change event (NCE) from at least one of the one or more network devices, can update routing tables of all network devices that would be affected by the NCE, and can transmit the updated routing tables to all the respective affected NDs.

In another aspect, AS1 can co-exist with other networks that may or may not be same as AS1. For instance, as shown in FIG. 1, AS1 can co-exist with another autonomous system shown as AS2. AS2 can comprise a network as known in prior art wherein individual network devices (shown as D21, D22, D23, D24, D25, D26 and D27) maintain their routing tables. Hence, AS1 shows CRS based routing that is part of the present disclosure while AS2 indicates traditional routing like OSPF.

As shown in FIG. 1 CRS 102 can be configured in an OOB network wherein all the NDs can communicate directly with the CRS using OOB ports on them, as already described. The devices (network devices) can be part of an in-band network (AS1) and can as well communicate with their direct neighboring NDs, as shown.

As already elaborated and shown in FIG. 1, CRS 102 communicates directly with all NDs it monitors and can send 'health check' messages to each. Thereby intercommunication amongst the NDs only for purpose of determining each other's health is avoided, eliminating lot of unnecessary traffic. Besides, each ND can determine status of another ND it is directly connected to using in-band communication for the purpose, and can provide such information to CRS 102.

In an aspect, upon connection of a new network device with at least one of said one or more network devices, the CRS, based on at least one network change event message received from the new network device, can determine network devices that are going to get impacted by addition of the new network device and can update their respective routing tables.

In another aspect, the network change event can include, for any of the one or more network devices, any or a combination of a software change, device crash, device reboot, device boot up, device shutdown, one or more links going down, one or more links coming up, addition of one or more links, removal of one or more links, device removal or replacement, new network device addition, power outage and power outage resolution.

As can be readily understood, there can be several examples of network change events that can be communicated by a ND to the CRS proposed. These can include, without limitation, a router crash and/or reboot, a link going down on a router, a link coming up on a router, a link coming up on a switch, a link going down on a switch, a switch crash/reboot, completion of a switch reboot, a switch shut down, power outage at a facility hosting some of the network devices, a network device coming up again after power outage is resolved, crashing of a critical process daemon on a router, a router process daemon restarting successfully, hanging of a network device, addition/removal/replacement of network devices.

In yet another aspect, the software change can include any or a combination of changes affecting networking capabilities of any of said one or more network devices, one or more configuration changes on any of said one or more network devices, critical user or system process crashing, critical user or system process unable to communicate or process data, critical user or system process functions getting restored, any of said one or more network devices or any component of any of said one or more network devices not responding, and any of said one or more network devices or any component of any of said one or more network devices getting restored.

In exemplary embodiments, pre-determined categories of networking devices can be excluded from generating messages pertaining to network change events and consequent actions by the CRS as elaborated above. For example, end host devices (such as clients and servers) need not generate such messages.

Figure 2:
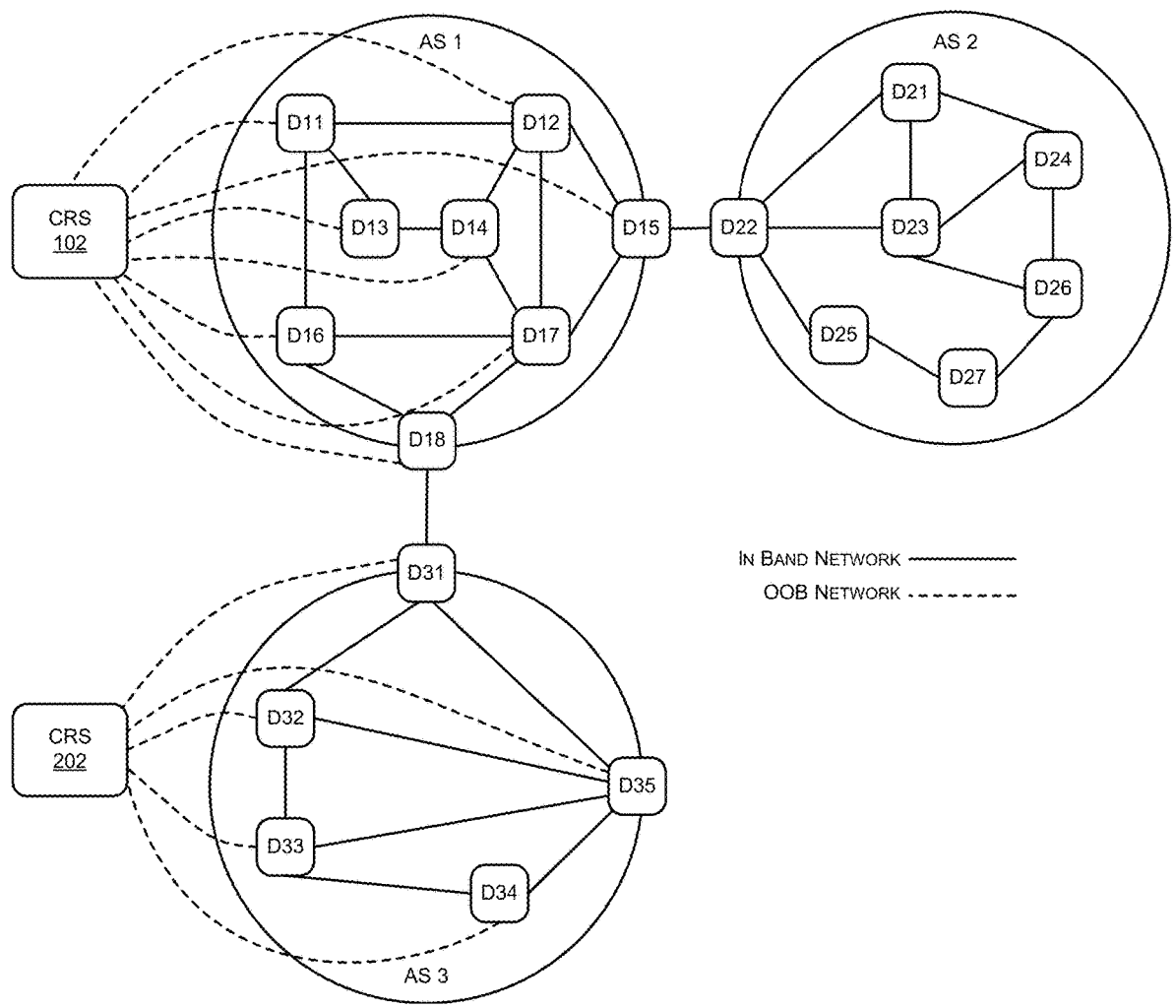
FIG. 2 illustrates a network diagram with showing multiple autonomous systems with CRS based routing collaborating with each-other and co-existing with other non-CRS based autonomous systems in accordance with an exemplary embodiment of the present disclosure.

FIG. 2 illustrates a network diagram showing multiple autonomous systems with CRS based routing collaborating with each-other and co-existing with other non-CRS based autonomous systems in accordance with an exemplary embodiment of the present disclosure.

In an aspect, CRS proposed can enable autonomous systems based on traditional routing to collaborate with autonomous systems based upon CRS based routing as disclosed in present disclosure. FIG. 2 shows AS1 as a first AS in which the various NDs (D11, D12, D13 . . . . D18) use CRS 102 for CRS based routing. Likewise, NDs in a third AS (AS3) shown as D31, D32, D33, D34 and D35 use CRS 202 for CRS based routing. However, NDs in a second AS (AS2) shown as D21, D22, D23, D24, D25, D26 and D27 use traditional routing (non-CRS routing) like OSPF. All such systems can co-exist.

AS1 can collaborate with AS3 through their respective CRS (CRS 102 and CRS 202). Further, AS1 can have an edge router shown as D18, while AS3 can have another edge router shown as D31. D18 can be coupled to CRS 102 while D31 can be coupled to CRS 202 as shown. Further, edge router D18 and D31 can be connected with each other as shown to facilitate transmission of packets between AS1 and AS3.

Since the CRS proposed is coupled to various network devices of an autonomous system (AS) through an OOB network, it can be appreciated that different CRSs handling different autonomous systems can run different routing algorithms per their own requirements, and can still work as part of a larger network (that comprises the different autonomous systems).

Figure 3:
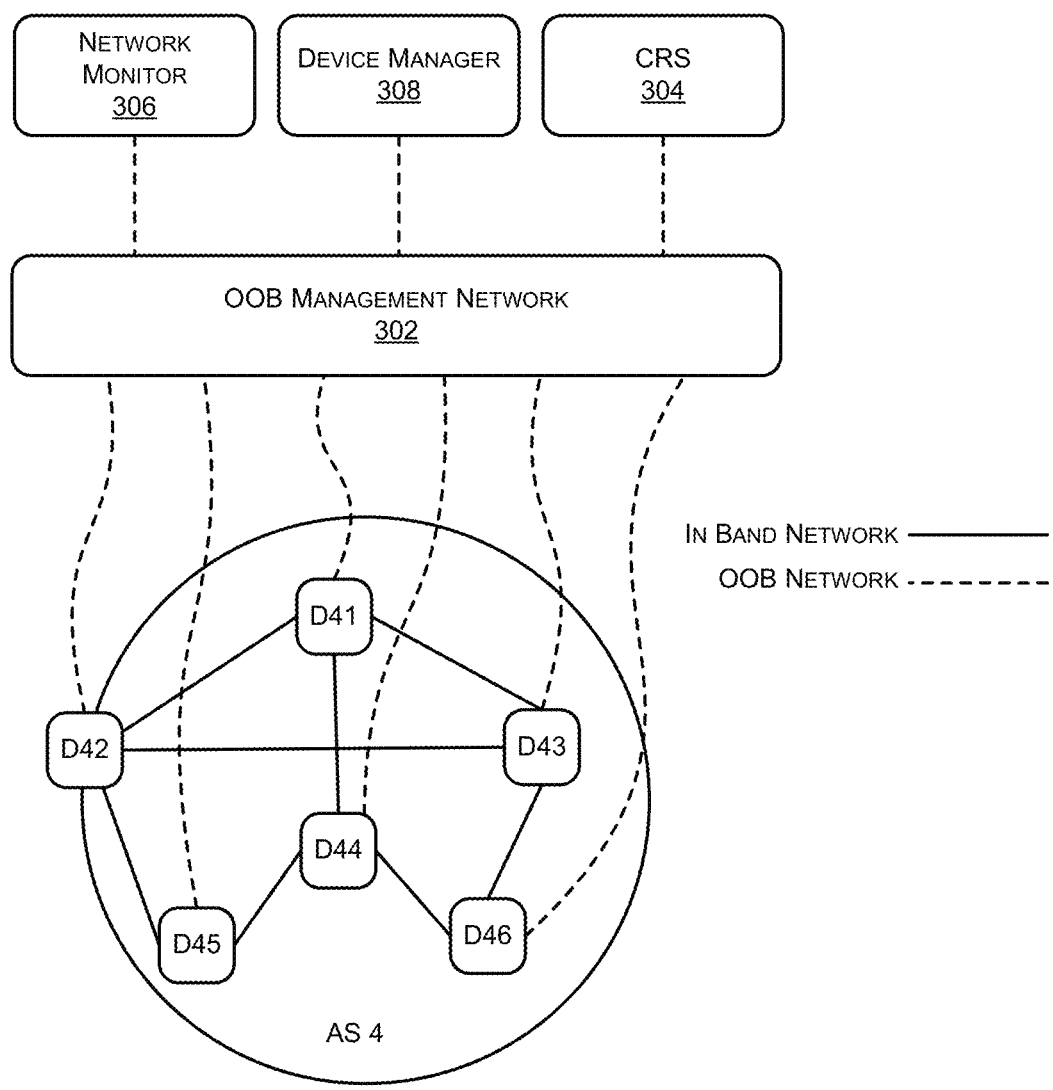
FIG. 3 illustrates devices in an autonomous system connecting to a CRS via the out-of-band management network in accordance with an exemplary embodiment of the present disclosure.

FIG. 3 illustrates network devices in an autonomous system connecting to a CRS via an out-of-band (OOB) management network in accordance with an exemplary embodiment of the present disclosure.

As shown in FIG. 3, an autonomous system (shown as fourth AS, AS4) can have CRS based routing. A CRS can be part of the OOB management network shown as 302. The CRS can connect to various network devices of AS4 (D41, D42, D43, D44, D45 and D46 as shown) using a corresponding OOB port on each of the network devices. Each of the OOB port can as well be used for connecting the network devices to management devices.

Figure 4:
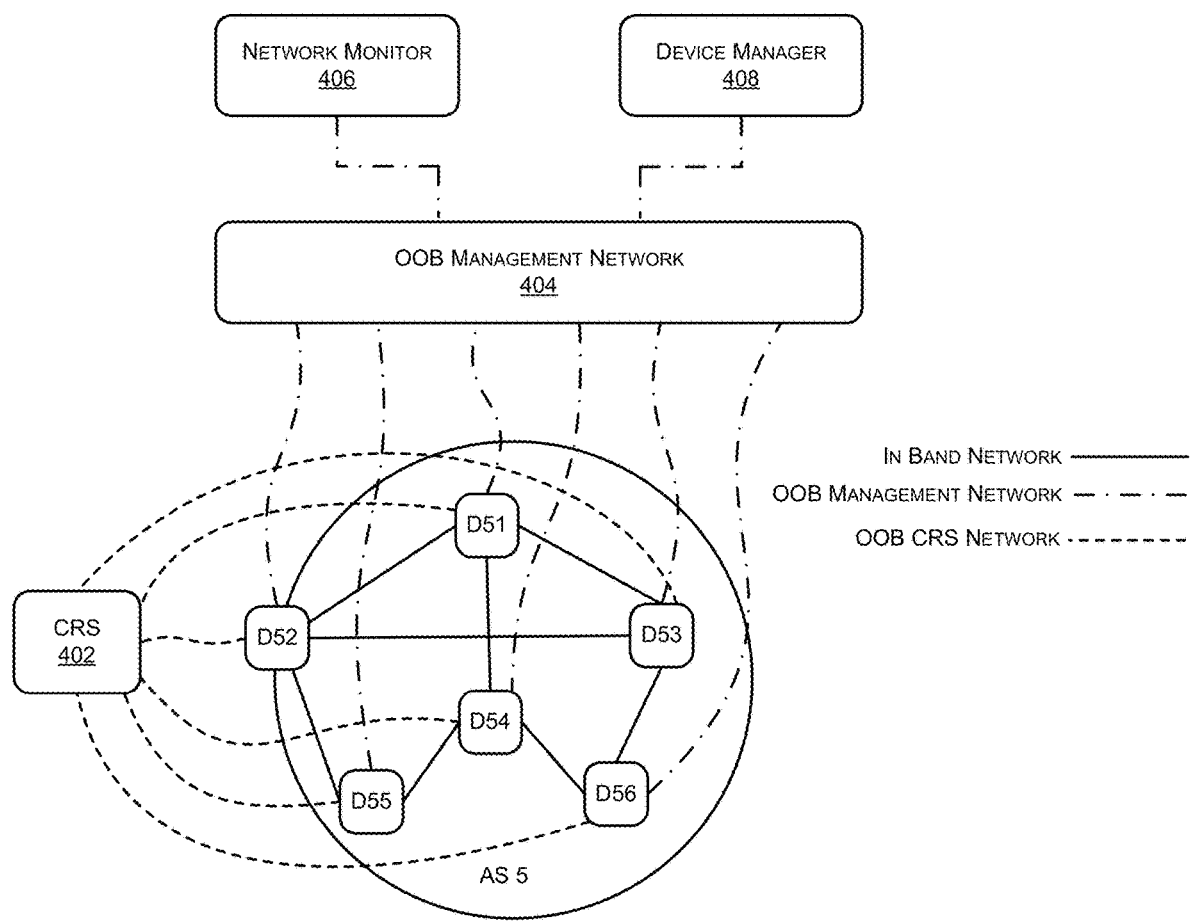
FIG. 4 illustrates devices in an autonomous system connecting to a CRS through a dedicated out-of-band network which is different from the out-of-band management network in accordance with an exemplary embodiment of the present disclosure.

FIG. 4 illustrates devices in an autonomous system connecting to a CRS through a dedicated out-of-band network which is different from the out-of-band management network in accordance with an exemplary embodiment of the present disclosure.

As shown in FIG. 4, a fifth autonomous system AS5 can have network devices D51, D52, D53, D54, D55 and D56. The devices can be coupled to CRS 402 through a dedicated network port on each of the network devices. CRS 402 need not be part of the OOB management network shown as 404.

Figure 5:
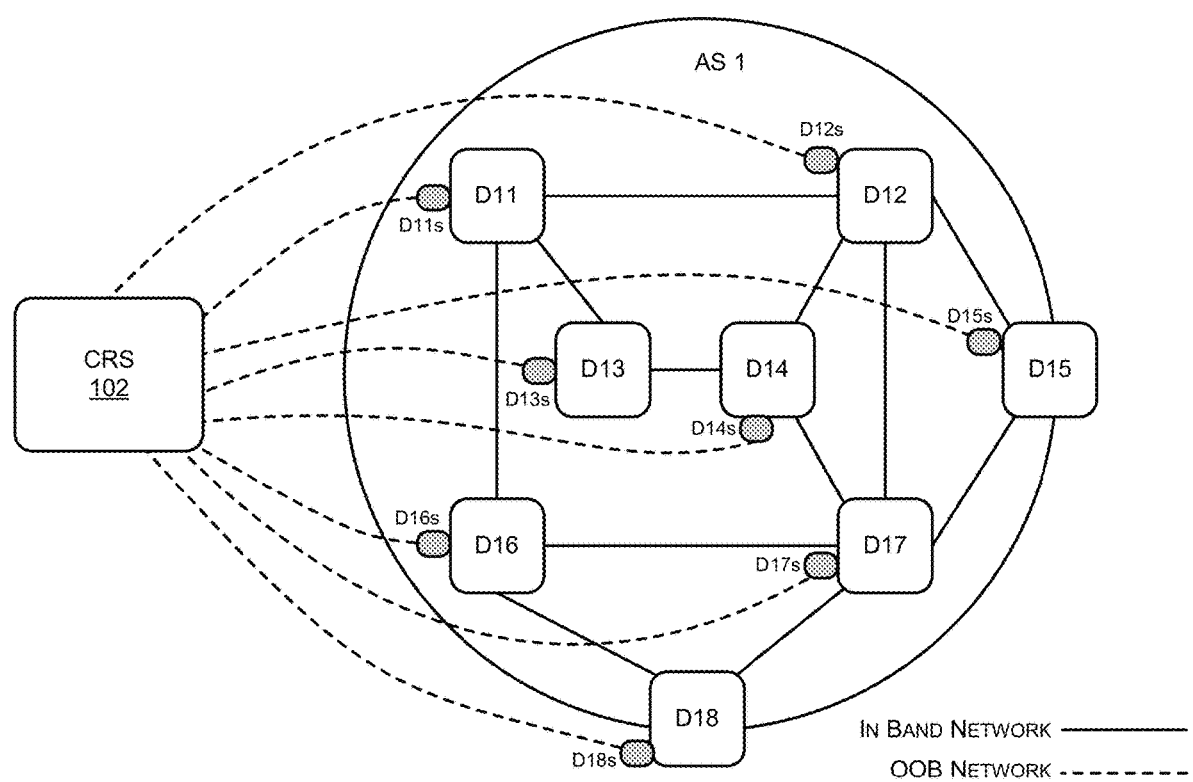
FIG. 5 illustrates a CRS based autonomous system with network devices connecting through SoC based ports in accordance with an exemplary embodiment of the present disclosure.

FIG. 5 illustrates a CRS based autonomous system with network devices connecting through SoC based ports in accordance with an exemplary embodiment of the present disclosure.

In an aspect, at least one of the one or more network devices can be a router. The router can comprise a network interface card (NIC) that is operatively coupled with a system-on-chip (SoC) having a micro-controller and a memory. The SoC can use a port of the router to connect to the CRS such that during normal operation, the router is coupled with said CRS through the port that is controlled by the NIC and when the router goes down, the router is connected with the CRS through the port that is controlled by the SoC.

It can be appreciated that in an autonomous system having NDs with SoC based ports, all NDs should connect to the CRS through this port only. If even one of the networking devices doesn't support the SoC based port, the SoC based port won't be useful since CRS would have to carry out regular health checks and wouldn't receive messages from NDs which crash because of absence of SoC based port.

FIG. 5 illustrates a CRS 102 operatively coupled using an OOB network to NDs shown as D11, D12, D13, D14, D15, D16, D17 and D18 of an autonomous system AS1. Each ND can have a port with SoC. For instance, D11 can have such a port shown as D11s and D16 can have a similar port shown as D16s. Such ports can be used to connect the corresponding network devices to CRS switch 102, as shown.

Figure 6:
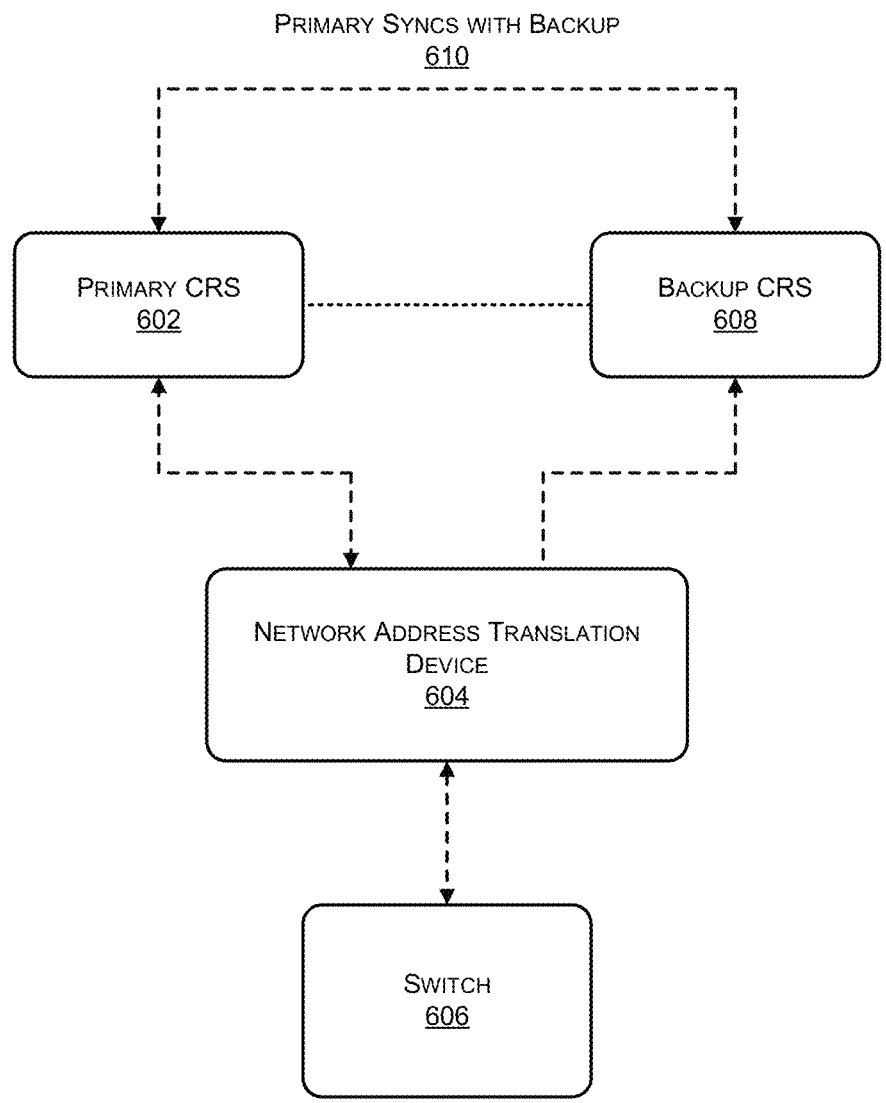
FIG. 6 illustrates a CRS based system, with a (primary) CRS being supported by one or more backup CRS in accordance with an exemplary embodiment of the present disclosure.

FIG. 6 illustrates a CRS based system, with a (primary) CRS being supported by one or more backup CRS in accordance with an exemplary embodiment of the present disclosure.

In an aspect, the CRS disclosed can be supported by at least one backup CRS. The backup CRS can sync regularly with the CRS using any or a combination of passively listening to network change events received by the CRS and exchanging messages with the CRS.

As illustrated in FIG. 6 a primary CRS 602 can communicate with in-band devices using NAT device 604 and switch 606 and can receive network change events and send updates (such as updated tables) to the in-band devices. All information in primary 602 can be synced regularly with backup CRS 608 as illustrated at 610 by exchanging appropriate messages. Or the backup CRS 608 can only passively listen to (receive) network change events as shown at 612 (such events also being received by primary CRS 602). As can be readily understood, in both cases the backup CRS 608 will always have the latest network state and can take over as primary CRS whenever such a need arises.

The in-band network devices need not be aware of presence of multiple CRS and can view the network system as consisting of only one CRS.

Figure 7:
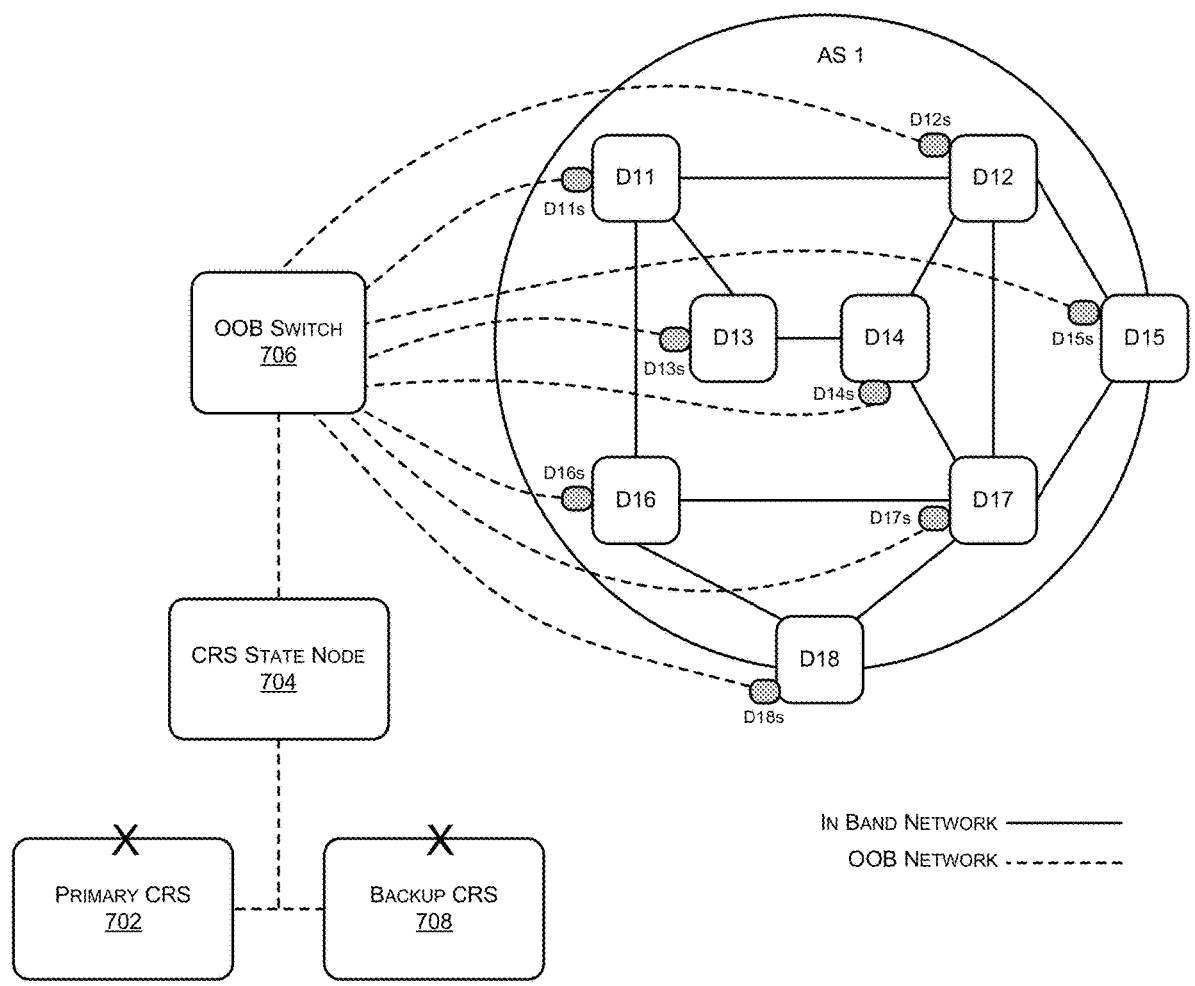
FIG. 7 illustrates a system in a CRS based network where a node is used to maintain the CRS state, and upon failure of all the CRS, the state node is capable of sending a message to all in-band devices about the failure of the CRS system in accordance with an exemplary embodiment of the present disclosure.

FIG. 7 illustrates a system in a CRS based network where a node is used to maintain the CRS state, and upon failure of all the CRS, the state node is capable of sending a message to all in-band devices about the failure of the CRS system in accordance with an exemplary embodiment of the present disclosure.

In an aspect, a node of the out-of-band network can send link break message to at least one of the one or more network devices when the CRS link with the at least one of the one or more network devices fails.

In another aspect, a node in the out-of-band network can broadcast CRS failure to all of the one or more network devices when the CRS fails or the at least one backup CRS fails to take over as the CRS when the CRS fails.

In the OOB Network, to avoid any routing overheads, all network devices and CRS should be in the same subnet. Otherwise, there would be some level of routing required in the OOB Network as well. A static routing policy with same route for upstream and downstream traffic could be adopted. If dynamic routing is chosen, routing would have to be managed in OOB Networks as well, either via routing protocols or possibly another CRS. Since a CRS Network has minimal devices, a design having a separate OOB Network for CRS is beneficial over deploying CRS in a common OOB Management Network.

In an embodiment where health checks are disabled on CRS, it would need the OOB Switches to inform about link failures. OOB Switches are different from In-Band Plug and Play Switches. In case of In-Band Switches, they send messages through the OOB port to CRS about link failures. However, OOB Switches are in the OOB Network itself. They communicate with CRS in the OOB Network itself using OOB Network Links.

Hence, for OOB Switches to send network events to CRS, they would have to be programmed to send such network events to the CRS via the OOB Links itself (which would be In-Band Links for the OOB Switch).

As illustrated later in FIG. 12, CRS 1202 and OOB Switch 1206 are part of the OOB Network 1201. When link between network device D18 and OOB Switch 1206 fails, the OOB Switch 1206 sends a Link Down event to the CRS 1202 to inform it about link failure in the OOB Network 1201, since this link failure breaks the communication between CRS 1202 and D18. Similarly, when the link comes back online the OOB Switch 1206 would send another event to CRS 1202 informing about the connection being restored. In this manner, the OOB switches can eliminate the need for CRS to run health checks with network devices.

The CRS State Node 704 is capable of monitoring the state of the CRS System, which may consist of Backup CRSs 708 to support Failover. If the Primary CRS 702 fails and there is no backup CRS 708, CRS State Node 704 would consider it as a CRS System Failure. However, if there is at least one backup CRS 708, node 704/proposed system can wait for a pre-determined time during which proposed system can attempt switching over to CRS 708 from primary CRS 702. In case the switch over is unsuccessful, proposed system can indicate a CRS system failure. CRS System failure may also occur when connectivity with the CRS is lost. If for any reason CRS State Node 704 determines that a CRS system failure has occurred, it can broadcast a failure message to all the in-band devices.

Figure 8:
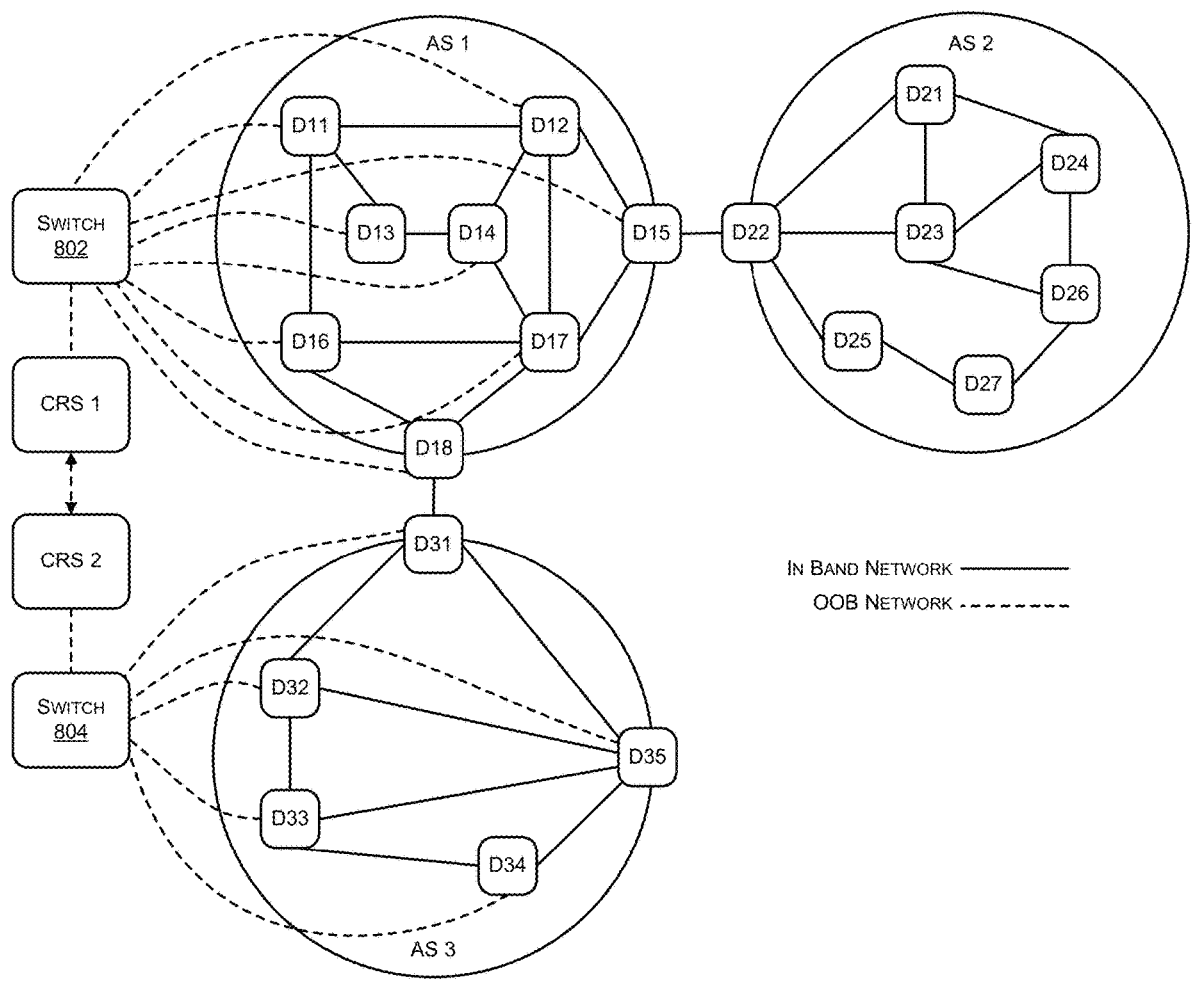
FIG. 8 illustrates an embodiment of a network illustrated in FIG. 2 where non-CRS based AS edge routers running BGP for inter-AS routing work with edge routers in CRS based AS in accordance with an exemplary embodiment of the present disclosure.

FIG. 8 illustrates an embodiment of a network illustrated in FIG. 2 where non-CRS based AS edge routers running BGP for inter-AS routing work with edge routers in CRS based AS in accordance with an exemplary embodiment of the present disclosure.

As illustrated, in case of plurality of autonomous systems (AS) communicating with each other, edge routers (for instance D15 and D12) can be running a routing protocol such as BGP (Border Gateway Protocol) for inter-AS routing in case they are not coupled using CRS disclosed. The AS (AS1) which has CRS (CRS1) can make routing decisions for routers that would have been iBGP peers in its AS. It can emulate iBGP protocol and receive/send updates from/to edge nodes, and instead of running iBGP on the routers it can be offloaded to CRS.

For neighboring ASs having CRS (such as AS1 and AS3), the edge routers can offload eBGP routing to the CRSs which collaborate with each-other to generate routing tables and process routing updates. For neighboring ASs where at least one of them uses traditional routing methods, the edge routers establish an eBGP connection. Same CRS methodology can be used with any other alternative to BGP.

As shown, D22 and D15 are eBGP peers, where D22 is working in a traditional autonomous system (AS) network (AS2) and runs BGP on its router as in traditional routing. D15 of network AS1 however peers with CRS1 and can send updates received from D22 to CRS1. CRS1 runs routing algorithms for D15 and sends routing tables and updates to D15 that can be in turn sent to D22 in BGP format.

As known, eBGP (external Border Gateway Protocol) is the version of BGP that is used to exchange BGP routing updates between two different AS's. eBGP is implemented on the edge BGP router that provides interconnection to other AS's Hence, for practical purposes, D22 sees D15 as BGP peer and D15 works with CRS routing.

In traditional BGP routing, D15 and D18 would be iBGP(internal BGP) peers. However, since they are managed by CRS1, CRS1 takes care of routing updates. D18 and D31 would have been BGP peers. However, due to collaboration with CRS1 and CRS2, they are able to work without BGP. CRS1 and CRS2 are capable of exchanging routing information and push inter-AS routing tables to D18 (by CRS1) and D31 (by CRS2).

As known, internal BGP (iBGP) is used to forward route updates received from an external BGP router through the internal network. With iBGP, a router within an AS does not exchange routing updates to another iBGP router. The ASN (autonomous system number) of the router is added and routes are advertised only when they are being sent to a BGP router in another autonomous system, i.e. to an eBGP router.

Figure 9:
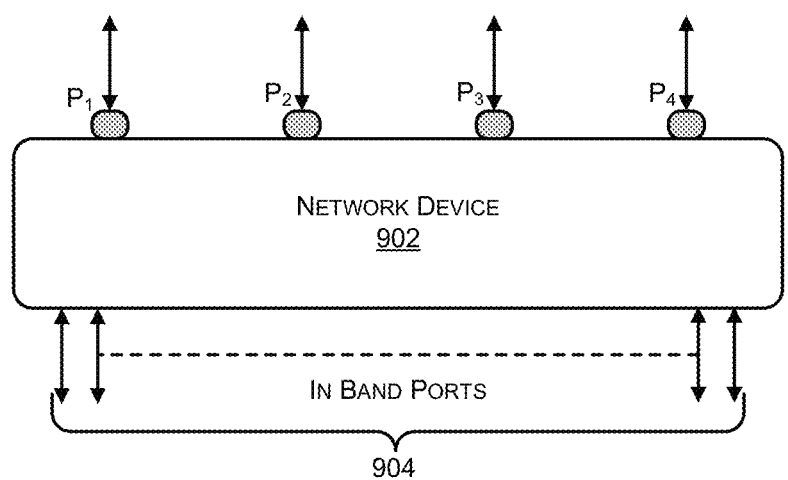
FIG. 9 illustrates port options on a network device that may be used for connecting to a CRS in accordance with an exemplary embodiment of the present disclosure.

FIG. 9 illustrates port options on a network device that may be used for connecting to a CRS in accordance with an exemplary embodiment of the present disclosure. The CRS may connect to the in-band network through regular network ports which may (optionally) also have SoC (System on Chip) support.

As shown in FIG. 9, a network device (ND) 902 can have out-of-band ports such as P1, P2, P3 and P4, any of which may be used for communicating with proposed CRS. All devices should use same port to connect to the CRS. That is, if ND 902 uses port P1 for the purpose, other NDs in the system should also use their respective P1. Likewise, if ND902 uses port P4, so should the other network devices. The physical medium standard for data communication could be any of the standards supported by the corresponding device(s) these ports connect to. For instance, it could be Ethernet, Wi-Fi, Bluetooth or any other equivalent.

In exemplary embodiments, P1 can be a regular OOB port for connecting to OOB networks, P2 can be a special OOB port for connecting specifically to the CRS. P3 can be a special type of P1 port that also supports SoC (System on Chip) and similarly, P4 can be a special type of P2 port that also supports SoC.

As illustrated at 904, ND 902 can have one or more in-band ports as well for connecting to other network devices in the in-band network ND 902 is residing in.

CRS proposed can likewise have one or more ports to connect to various in-band devices through the OOB ports configured in them, as elaborated above. Ports in the CRS can (optionally) have SoC for connections to OOB ports of the in-band NDs.

Figure 10:
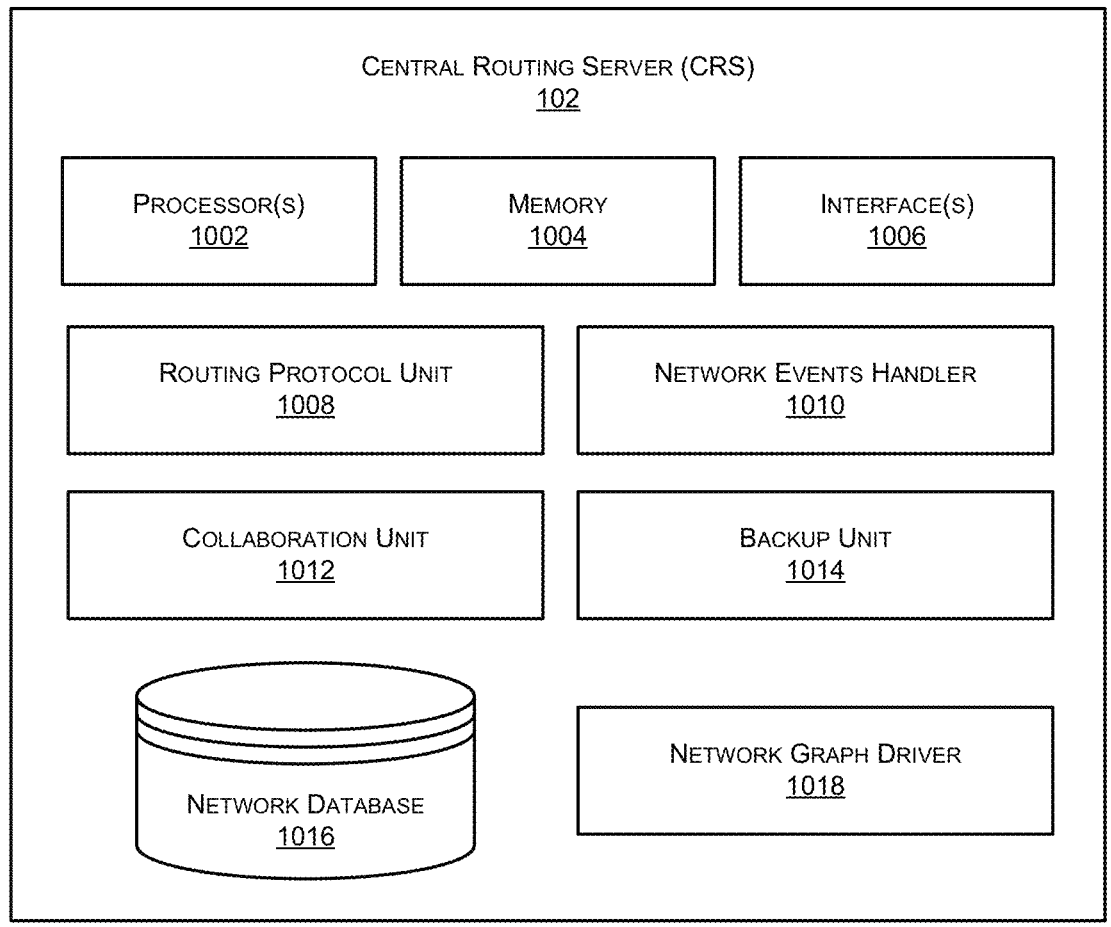
FIG. 10 illustrates components of CRS proposed in accordance with an exemplary embodiment of the present disclosure.

FIG. 10 illustrates components of CRS proposed in accordance with an exemplary embodiment of the present disclosure.

In an aspect, CRS proposed (for instance CRS 102 as shown in FIG. 1) may include one or more processor(s) 1002. The one or more processor(s) 1002 may be implemented as one or more microprocessors, microcomputers, microcontrollers, digital signal processors, central processing units, logic circuitries, and/or any devices that manipulate data based on operational instructions. Among other capabilities, the one or more processor(s) 1002 are configured to fetch and execute computer-readable instructions stored in a memory 1004 of the CRS 102. The memory 1004 may store one or more computer-readable instructions or routines, which may be fetched and executed to create or share the data units over a network service. The memory 1004 may include any non-transitory storage device including, for example, volatile memory such as RAM, or non-volatile memory such as EPROM, flash memory, and the like. Processors 1002 may receive inputs from various other units/components further elaborated to prepare a customized beverage as required by a user.

In another aspect, CRS 102 may also include an interface (s) 1006. The interface(s) 1006 may include a variety of interfaces, for example, interfaces for data input and output devices, referred to as I/O devices, storage devices, and the like. The interface(s) 1006 may facilitate communication of the CRS 102 with various devices coupled to the CRS 102, or its users. The interface(s) 1006 may also provide a communication pathway for one or more components of the CRS 102.

In an aspect, other components of the proposed CRS can include a routing protocol unit 1008, a network events handler 1010, a collaboration unit 1012, a backup unit 1014, a network database 1016 and a network graph driver 1018, besides other units and sub-units. Each of these units can have its own set of data-structures and sub-units to carry its functions.

Components as above and further described may be implemented as a combination of hardware and programming (for example, programmable instructions) to implement one or more functionalities of the processor(s) 1002. In examples described herein, such combinations of hardware and programming may be implemented in several different ways. For example, the programming for the processor(s) 1002 may be processor executable instructions stored on a non-transitory machine-readable storage medium and the hardware for the processor(s) 1002 may include a processing resource (for example, one or more processors), to execute such instructions. The CRS 102 may include the machine-readable storage medium storing the instructions and the processing resource to execute the instructions, or the machine-readable storage medium may be separate but accessible to CRS 102 and the processing resource. In other examples, the processor(s) 1002 may be implemented by electronic circuitry.

In an aspect, proposed CRS can include routing protocol unit 1008 to control the one or more processors 1002 to process, generate and maintain routing information and required logic for various in-band network devices coupled with the CRS.

In an exemplary embodiment, routing protocol unit 1008 can be one or more processors dedicatedly used to perform functionalities of unit 1008 as elaborated above.

In an aspect, proposed CRS can include network events handler 1010 to control the one or more processors 1002 to receive all network change events (NCEs) of various network devices of an autonomous system that the CRS proposed is monitoring, update routing tables of all network devices that would be affected by the NCE, and transmit the updated routing tables to all the respective affected NDs.

In an exemplary embodiment, network events handler 1010 can be one or more processors dedicatedly used to perform functionalities of handler 1010 as elaborated above.

In an aspect, proposed CRS can include collaboration unit 1012 to control the one or more processors 1002 to enable CRS proposed to collaborate with CRSs of other autonomous systems, as elaborated via FIG. 2. Unit 1012 can store required information about other neighboring autonomous systems based on interactions with CRS of those systems, and can enable inter-AS routing.

In an exemplary embodiment, collaboration unit 1012 can be one or more processors dedicatedly used to perform functionalities of unit 1012 as elaborated above.

In an aspect, proposed CRS can include backup unit 1014 to control the one or more processors 1002 to communicate and sync regularly with one or more backup CRS and enable any of the backup CRS to take over from the CRS (primary CRS) in case the CRS fails, as elaborated via FIG. 6. Unit 1014 can as well determine if the CRS is acting as primary CRS or backup CRS.

In an exemplary embodiment, backup unit 1014 can be one or more processors dedicatedly used to perform functionalities of unit 1014 as elaborated above.

In an aspect, proposed CRS can include network database 1016 that can store various network related information and provide the same to other units to enable efficient networking. Such information can include any or a combination of current device tables of all network devices the CRS is coupled with, device configuration of all the network devices and network state with state of all components therein.

In an exemplary embodiment, network database 1016 can be one or more processors dedicatedly used to perform functionalities of database 1016 as elaborated above.

In an aspect, proposed CRS can include network graph driver 1018 to control the one or more processors 1002 to enable the routing protocol unit 1008 to optimally carry out its routing functions and enable proposed CRS to provide an overall display of network devices coupled to the CRS in form of an easily comprehensible graph. Such display can be provided, for instance, to display of a computing operatively coupled to the proposed CRS.

In an exemplary embodiment, network graph driver 1018 can be one or more processors dedicatedly used to perform functionalities of driver 1018 as elaborated above.

It would be appreciated that units and components elaborated above are only exemplary units and any other unit or sub-unit can be included as part of the proposed system. These units too can be merged or divided into super-units or sub-units as may be configured and can be spread across one or more computing devices operatively connected to each other using appropriate communication technologies.

Further, although the proposed system has been elaborated as above to include all the main units, it is completely possible that actual implementations may include only a part of the proposed units or a combination of those or a division of those into sub-units in various combinations across multiple devices that can be operatively coupled with each other, including in the cloud. Further the units can be configured in any sequence to achieve objectives elaborated. Also, it can be appreciated that proposed system can be configured in a computing device or across a plurality of computing devices operatively connected with each other, wherein the computing devices can be any of a computer, a laptop, a smart phone, an Internet enabled mobile device and the like. Therefore, all possible modifications, implementations and embodiments of where and how the proposed system is configured are well within the scope of the present invention.

Figure 11:
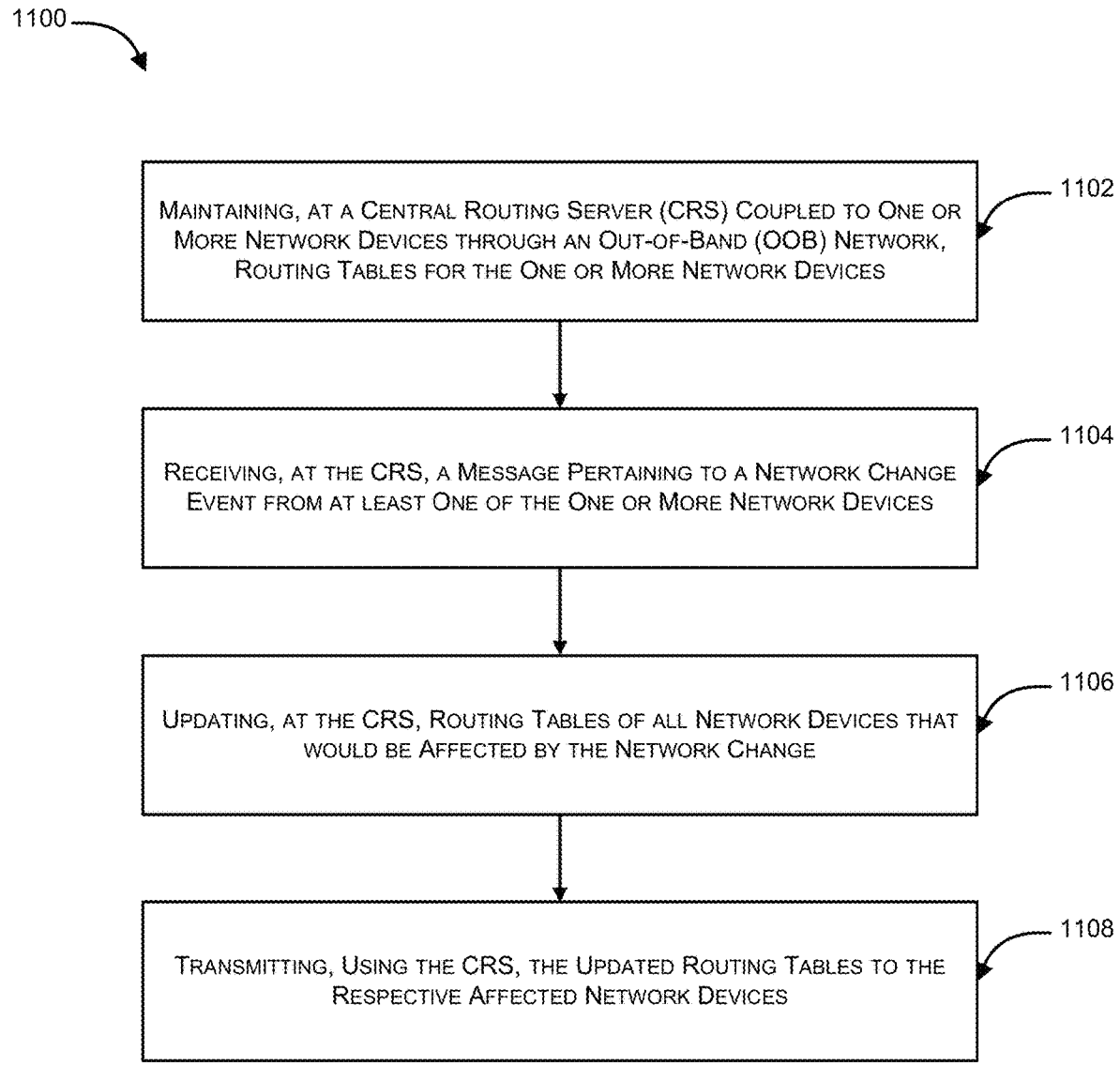
FIG. 11 elaborates upon a method for plug and play routing in accordance with an exemplary embodiment of the present disclosure.

FIG. 11 elaborates upon a method for plug and play routing in accordance with an exemplary embodiment of the present disclosure.

In an aspect, a method for plug and play routing can include, at block 1102, maintaining, at a central routing server (CRS) coupled to one or more network devices through an out-of-band (OOB) network, routing tables for the one or more network devices; and at block 1104, receiving, at the CRS, a message pertaining to a network change event from at least one of the one or more network devices.

The method can further include, at block 1106, updating, at the CRS, routing tables of all network devices that would be affected by the network change event; and at block 1108, transmitting, using the CRS, the updated routing tables to the respective affected network devices.

The proposed method as elaborated above can be described in general context of computer executable instructions. Generally, computer executable instructions can include routines, programs, objects, components, data structures, procedures, modules, functions, etc., that perform particular functions or implement particular abstract data types. The method can also be practiced in a distributed computing environment where functions are performed by remote processing devices that are linked through a communications network. In a distributed computing environment, computer executable instructions may be located in both local and remote computer storage media, including memory storage devices.

The order in which the method as described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described above the method may be considered to be implemented in the above described system.

Figure 12:
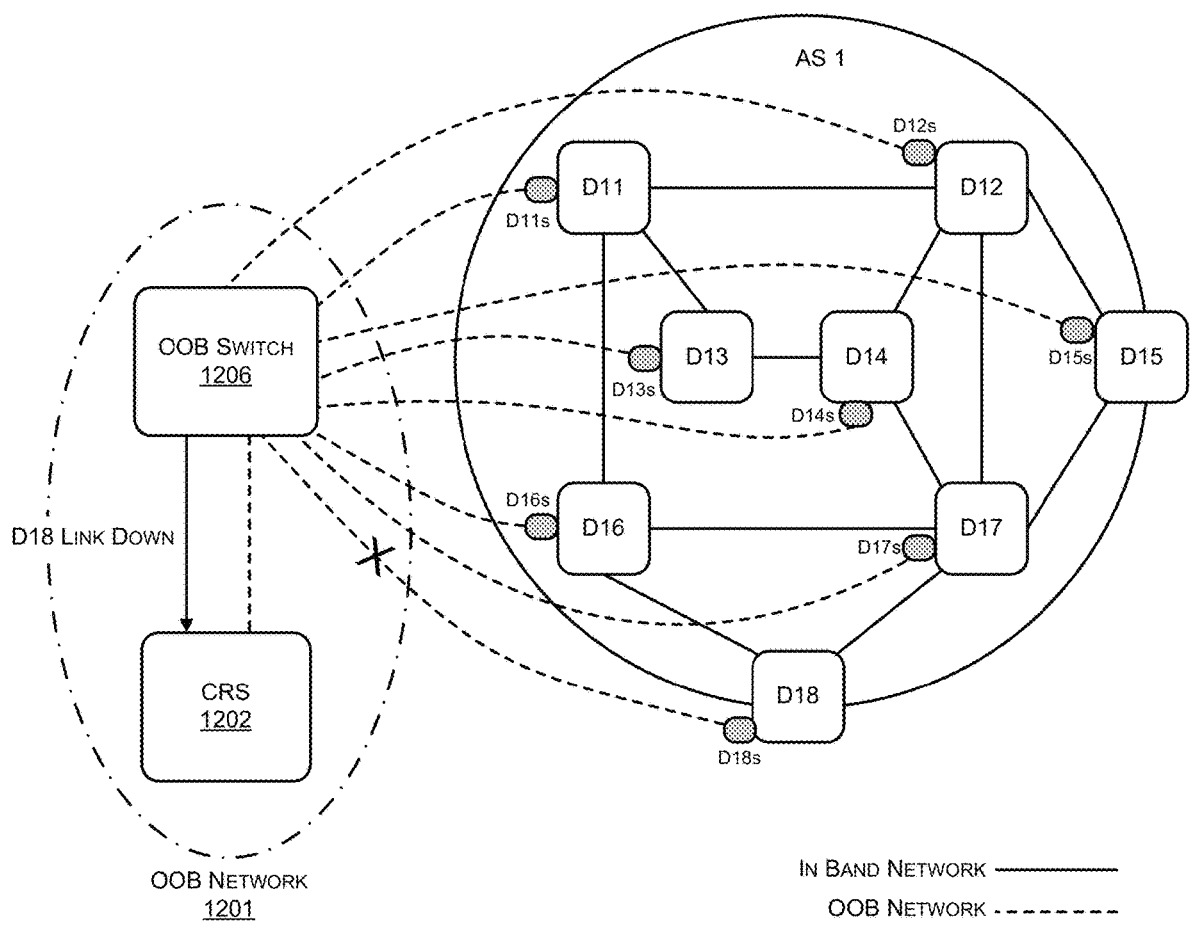
FIG. 12 illustrates a case when one of the network links with the in-band devices fails, in accordance with an exemplary embodiment of the present disclosure.

FIG. 12 illustrates a case when one of the network links with the in-band devices fails, in accordance with an exemplary embodiment of the present disclosure.

FIG. 12 illustrates an OOB network with plug and play features in accordance with an exemplary embodiment of the present disclosure. It illustrates OOB switch in the OOB network, which is also capable of sending messages about link failures to the CRS. It is an illustration of a case when one of the network links with the in-band devices fails, and the OOB switch sends a message to the CRS about the link with the device getting broken.

As illustrated in FIG. 12, CRS 1202 and OOB Switch 1206 are part of the OOB Network 1201. When link between network device D18 and OOB Switch 1206 fails, the OOB Switch 1206 sends a Link Down event to the CRS 1202 to inform it about link failure in the OOB Network 1201, since this link failure breaks the communication between CRS 1202 and D18. Similarly, when the link comes back online the OOB Switch 1206 would send another event to CRS 1202 informing about the connection being restored. In this manner, the OOB Switches can eliminate the need for CRS to run health checks with network devices.

As used herein, and unless the context dictates otherwise, the term "coupled to" is intended to include both direct coupling (in which two elements that are coupled to each other or in contact with each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

Advantages of the Invention

The present disclosure provides for a system that reduces the amount of networking traffic that among various networking devices of a network with consequent advantages.

The present disclosure provides for a system that reduces resolution (time taken) of identifying a network change.

The present disclosure provides for more efficient network devices resulting in better network resilience.

Proposed system divides a large network in zones/Autonomous Systems. There is no one centralized controller managing the complete network. Hence a single point of failure is avoided which is a concern with a centralized SDN Controller managing the complete network. If a CRS fails, the failure is restricted only to zone/AS/network operatively coupled to it. Even with a CRS failure, various NDs and the network can remain functional but network failures/ND failures will not be responded to.

As network devices don't run any routing protocols/health checks/updates, there is elimination of routing protocol traffic completely from the in-band network. As routing protocols get offloaded to CRS, NDs need not run them, leading to reduction in memory and processing requirements at the NDs.

Two different autonomous systems, each with its own CRS, can run totally different routing algorithms and yet co-exist in the same (larger network). Hence heterogeneous networks can be managed with some having older routing protocols and NDs accordingly, and other having newer routing schemes.

The design elaborated can enable selective upgrades of portions of a network instead of upgrade of the complete network at once (which may be difficult, slow, and unfeasible). Selective network upgrades can limit any issues/errors. An administrator can, for example, upgrade one part of the network, and if it works as per expectation for a certain period of time, upgrade other parts. Network failure in a centralized system due to any reason is a high risk and dividing a network into smaller segments lowers that risk. Even hardware upgrades to newer systems can be carried out selectively as newer systems can co-exist with autonomous systems having older ones.

I claim:

1. A central routing server (CRS) coupled to one or more network devices through an out-of-band (OOB) network wherein:

said CRS maintains routing tables for the one or more network devices and, upon receiving a message pertaining to a network change event from at least one of the one or more network devices, updates routing tables of all network devices that would be affected by the network change event, and transmits said updated routing tables to the respective affected network devices;

said one or more network devices are selected from any or a combination of devices in an in-band network that are involved in forwarding data received from one link on one of said one or more network devices to one or more links on at least one another of said one or more network devices, the forwarded data being modified or unmodified data;

said routing tables comprise of any tables used in making forwarding decisions by said one or more network devices for forwarding data, and/or any tables used in generating such tables that are used in making forwarding decisions by said one or more network devices;

said network change event comprises, for any of said one or more network devices, any or a combination of a software change, device crash, device reboot, device boot up, device shutdown, one or more links going down, one or more links coming up, addition of one or more links, removal of one or more links, device removal or replacement, new network device addition, power outage and power outage resolution; and said software change comprises any or a combination of changes affecting networking capabilities of any of said one or more network devices, one or more configuration changes on any of said one or more network devices, critical user or system process crashing, critical user or system process unable to communicate or process data, critical user or system process functions getting restored, any of said one or more network devices or any component of any of said one or more network devices not responding, and any of said one or more network devices or any component of any of said one or more network devices getting restored.

2. The CRS of claim 1, wherein said one or more network devices form a first autonomous system (AS).

3. The CRS of claim 2, wherein said first AS co-exists with a second AS whose network devices manage respective routing tables.

4. The CRS of claim 3, wherein the first AS collaborates with a third AS through respective CRSs, each of the first and third ASs comprising a respective edge router that is coupled with respective CRS, and wherein the edge routers of the respective first and third ASs are connected with each other to facilitate transmission of packets between the first and the third ASs.

5. The CRS of claim 4, wherein CRS of a fourth AS connects to network devices in the fourth AS through same OOB port on each of the network devices as used for connecting to management devices, the CRS being part of the OOB management network.

6. The CRS of claim 4, wherein CRS of a fifth AS connects to network devices of the fifth AS through a dedicated network port on each of the network devices, wherein the CRS is not part of an OOB management network.

7. The CRS of claim 2, wherein said CRS provides basic interface configuration and initial device tables to a new network device added to said AS to enable said new network device function on said AS.

8. The CRS of claim 1, wherein upon connection of a new network device with at least one of said one or more network devices, said CRS, based on at least one network change event message received from said new network device, determines network devices that are going to get impacted by addition of the new network device and updates their respective routing tables.

9. The CRS of claim 1, wherein at least one of the one or more network devices is a router, said router comprising a network interface card (NIC) that is operatively coupled with a system-on-chip (SoC) having a micro-controller and a memory, said SoC using a port of the router to connect to the CRS such that during normal operation, said router is coupled with other network devices through a port that is controlled by the NIC whereas when the router goes down, said router is connected with the CRS through the port that is controlled by the SoC.

10. The CRS of claim 1, wherein the CRS is supported by at least one backup CRS and wherein the at least one backup CRS syncs regularly with the CRS using any or a combination of passively listening to network change events received by the CRS and exchanging messages with the CRS.

11. The CRS of claim 1, wherein a node in the out-of-band network sends link break message to at least one of the one or more network devices when the CRS link with said at least one of the one or more network devices fails.

12. The CRS of claim 11, wherein a node in the out-of-band network broadcasts CRS failure to all of said one or more network devices when said CRS fails or said at least one backup CRS fails to take over as said CRS when said CRS fails.

13. The CRS of claim 1, said CRS comprising one or more processors; a routing protocol unit to control the one or more processors to process, generate and maintain routing information and required logic for various in-band network devices coupled with said CRS; and a network events handler to control the one or more processors to: receive all network change events (NCEs) of various network devices of an autonomous system (AS) that said CRS is monitoring; update routing tables of all network devices that would be affected by the NCE; and transmit the updated routing tables to all the respective affected NDs.

14. The CRS of claim 13, said CRS comprising any or a combination of:
a collaboration unit to control the one or more processors to enable said CRS to collaborate with CRSs of other autonomous systems, and enable inter-AS routing;
a backup unit to control the one or more processors to communicate and sync regularly with a backup CRS and enable the backup CRS to take over from the CRS (primary CRS) in case the CRS fails, determine if the CRS is acting as primary CRS or backup CRS, and enable interactions with all other CRSs in a network;
a network database to store various network related information and provide the same to other units to enable efficient networking, wherein said network related information comprises any or a combination of current device tables of all network devices the CRS is coupled with, device configuration of all the network devices and network state with state of all components therein; and
a network graph driver to control the one or more processors to enable said CRS to: a) provide an overall display of network devices coupled to said CRS in form of an easily comprehensible graph and b) for said Routing Protocol Unit to optimally carry out its routing functions.

15. The CRS of claim 1, wherein said CRS requests said one or more network devices for current state of particular device element or complete device state at the time of request such that said one or more network devices read and respond to said requests as network state events.

16. The CRS of claim 1, wherein said network change event carries any or a combination of unique ID of said at least one of the one or more network devices and unique ID of ports/interfaces of said at least one of the one or more network devices.

17. The CRS of claim 1, wherein said CRS runs periodic health checks on said one or more network devices to ensure connectivity with said one or more network devices.

18. The CRS of claim 1, wherein said one or more network devices request said CRS for said updated routing tables.

* * * * *